United States Patent
Temme et al.

[11] 3,960,265
[45] June 1, 1976

[54] MINING INSTALLATIONS

[75] Inventors: Helmut Temme, Waltrop; Werner Hageneier, Altlunen; Hans-Dieter Schneider, Lunen, all of Germany

[73] Assignee: Gewerkschaft Eisenhutte Westfalia, Westfalia, Germany

[22] Filed: Jan. 16, 1975

[21] Appl. No.: 541,553

[30] Foreign Application Priority Data
Jan. 16, 1974 Germany............................ 2401833

[52] U.S. Cl............................... 198/204; 198/168
[51] Int. Cl.². ....................................... B65G 15/60
[58] Field of Search ................. 198/204, 168, 7, 11, 198/126

[56] References Cited
FOREIGN PATENTS OR APPLICATIONS

| | | | |
|---|---|---|---|
| 650,134 | 6/1965 | Belgium.............................. | 198/204 |
| 1,178,389 | 9/1964 | Germany............................ | 198/126 |
| 2,030,437 | 12/1971 | Germany............................ | 198/204 |

Primary Examiner—Evon C. Blunk
Assistant Examiner—Douglas D. Watts
Attorney, Agent, or Firm—Sughrue, Rothwell, Mion, Zinn & Macpeak

[57] ABSTRACT

A mining installation has a scraper-chain conveyor for transferring material and which is constructed in known manner from a series of channel sections joined end-to-end. A shifting apparatus serves to bodily displace the conveyor in a longitudinal direction and the connveyor is reinforced by means of L-shaped stiffening members attached to the exteriors of the side walls of the channel sections. These stiffening members or plates are interconnected by means of coupling plates which permit pivotal movement in a vertical plane as well as some free horizontal movement. The upper sides of the stiffening plates extend over the side walls of the channel sections and are provided or formed with webs or the like for the reception and connection of further barrier plates and their supports for example.

7 Claims, 4 Drawing Figures

MINING INSTALLATIONS

BACKGROUND OF THE INVENTION

The present invention relates in general to mineral mining installations and more particularly to scraper-chain conveyors for transferring material.

In mining, it is known to employ conveyors of various kinds but especially useful are scraper-chain conveyors. Such conveyors are often installed in longwall workings and in drifts or roadways adjoining such workings. From time to time it is necessary to displace these conveyors and various forms of shifting apparatus are known for this purpose. The forces imparted to the conveyor to effect its displacement can produce many problems. The invention is particularly concerned with the combination of a conveyor and a shifting apparatus for displacing the conveyor longitudinally and seeks to provide an improved form of reinforcement for a conveyor of conventional construction and size.

BRIEF SUMMARY OF THE INVENTION

In accordance with one aspect of the invention there is provided a scraper chain conveyor comprising a series of channel sections arranged end-to-end, each channel section being composed of two side walls each with a generally sigma-shaped cross-section and a floor connected between the walls, a scraper-chain assembly for movement along the channel sections to effect transference of material and reinforcement means for the channel sections, said reinforcement means being in the form of stiffening members attached to the exteriors of the side walls of each channel section to substantially cover said exteriors and coupling means interconnecting the stiffening members the upper sides of the stiffening members being shaped to receive and connect with further plates which can extend upwardly beyond the side walls of the channel sections whereby to increase the capacity of the conveyor.

Preferably the stiffening members or plates have an L-shaped profile with an upper portion extending over the upper flange of the associated channel section side wall. These upper portions may have integral or attached webs or bars for receiving and connecting with the aforesaid further plates which form barrier plates. These further plates can be inclined outwardly and additionally supported by individual supports also connected to the upper portions of the stiffening members. It is desirable for the coupling means to allow some free movement between the stiffening members. To this end each coupling means can be a plate which overlaps end portions of the stiffening members connected thereby, the coupling plate carrying pins which locate within eccentric bores in the associated stiffening members. Preferably the ends of the coupling plate are curvilinear and engage on end abutment surfaces of the stiffening members.

Cover plates may be connected between the stiffening members of each channel section so as to screen off the lower side of the conveyor from the floor.

The shifting apparatus which serves to displace the conveyor is preferably of the type which comprises two through-like components on which one or more of the conveyor channel sections rest; these components being selectively lockable to the conveyor and relatively displaceable with the aid of one or more shifting rams. Means, such as hydraulic props, serve to clamp one or other component to the surrounding mine gallery so that this component can act as an abutment for the ram or rams whereby the other free component can be locked to the conveyor and displaced therewith by the ram or rams.

The invention may be understood more readily and various other features of the invention may become more apparent from consideration of the following description:

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
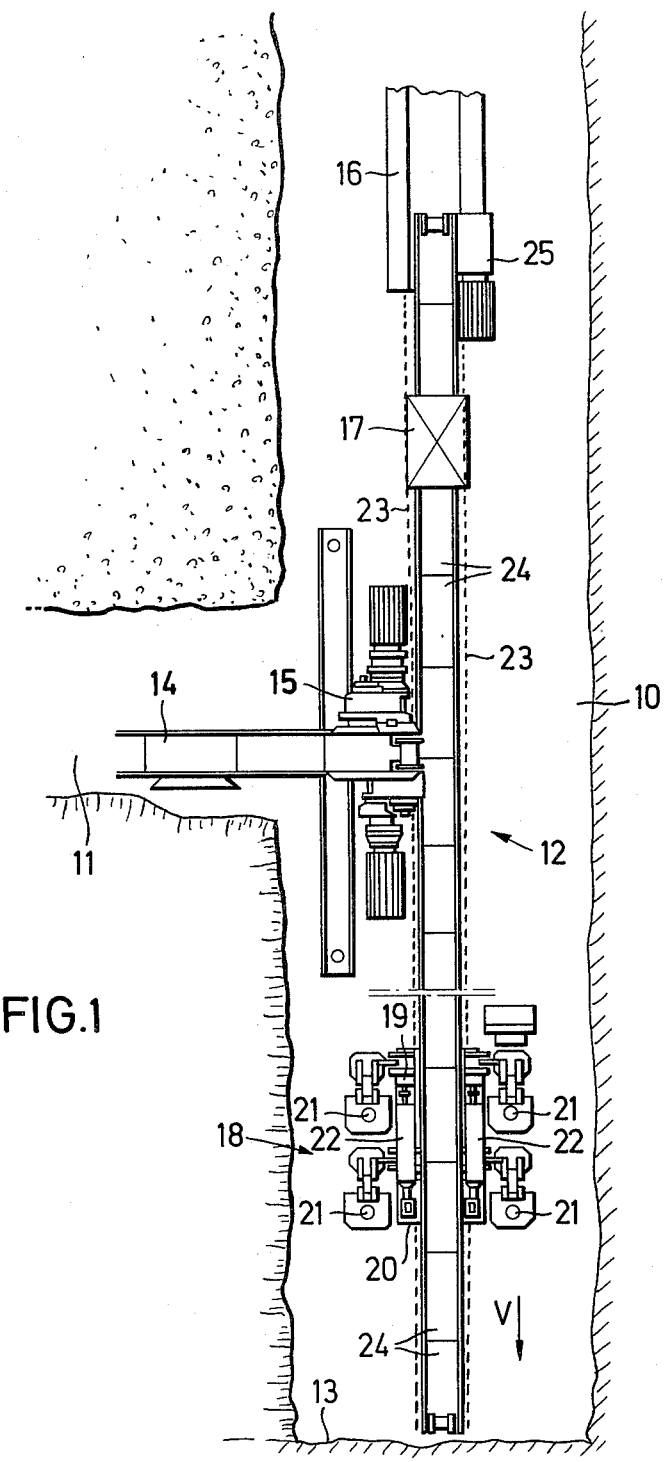
FIG. 1 is a schematic plan view of a mineral mining installation employing a scraper-chain loading conveyor made in accordance with the invention.

As shown in FIG. 1 a loading scraper-chain conveyor 12 made in accordance with the invention is arranged in the drift or roadway 10 of a mine working. A further scraper-chain conveyor 14 is in known manner arranged in a longwall gallery 11 and a mineral winning machine serves to remove mineral, more usually coal, from a mineral face in the longwall gallery 11. The conveyor 12 serves to transfer material removed from the end face 13 of the drift 10 as well as the material delivered by the conveyor 14. The conveyor 14 is disposed more or less perpendicularly to the conveyor 12 and has a drive station 15 disposed in the drift 10.

The end of the conveyor 14 adjoining this drive station is disposed generally above the conveyor 12 and serves to discharge material onto the conveyor 12. The conveyor 12 itself discharges material onto another conveyor 16 which may be a simple belt conveyor.

A device 17 for breaking up and controlling the flow of material is mounted on the conveyor 12 and is movable therewith.

In order to displace the conveyor 12 forwardly towards the end face 13 of the drift 10 a shifting apparatus 18 is provided. This apparatus 18, which is basically known per se, comprises a guide member 19 and a traction or thrust member 20. Each member 19, 20 is of trough-shaped cross-section and extends beneath the conveyor 12. Each member 19, 20 is connected to foot plates or the like bearing hydraulically-operated extendible props 21; the props 21 and foot plates being located on either side of the conveyor 12. The props 21 carry suitable roof engaging caps and can be operated to become set between the floor and roof of the drift 10 to thereby clamp either of the members 19, 20 in position or retracted to enable the member 19, 20 in question to be displaced. A double-acting hydraulic piston and cylinder unit or ram 22 is disposed on either side of the conveyor 12 and is connected between the members 19, 20. A chain 23 is arranged along each side of the conveyor 12 and each member 19, 20 has pawl devices (not shown in the drawing) which can selectively engage with the chains 23. The shifting apparatus 18 is operated so that the rear props 21, which are connected to the member 19, are braced so that the member 19 forms an abutment for the rams 22. The rams 22 are now extended to urge the member 20 forwards in the direction of the arrow V and the pawl devices of the member 20 engage with the chains 23 so that the chains 23 and hence the conveyor 12 is also moved up. The stationary member 19 serves to guide the conveyor 12 during its displacement. When the rams 22 have been fully extended the pressure fluid is supplied in a reverse sense to retract the rams 22 and the pawl devices are released from the chains 23 permitting the member 20 and the props 21 connected thereto to move back to their former position. The operative sequence can then be repeated by extending the rams 22 again. The conveyor 12 can be displaced by the desired distance by successive cycles of extending and retracting the rams 22. When it is desired to move up the entire apparatus 18 the members 19, 20 would be alternately braced by means of their associated props 21 and the rams 22 alternately extended and retracted to cause the apparatus 18 to "walk" in the direction V. During this operative sequence the pawl devices of the members 19, 20 would be rendered non-operative so as not to lock with the chains 23.

Figure 2:
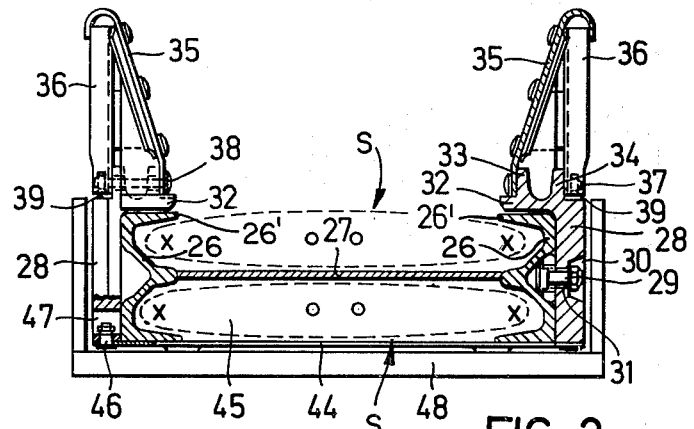
FIG. 2 is a cross-sectional view of the loading conveyor on a somewhat enlarged scale to that of FIG. 1.
Figure 3:
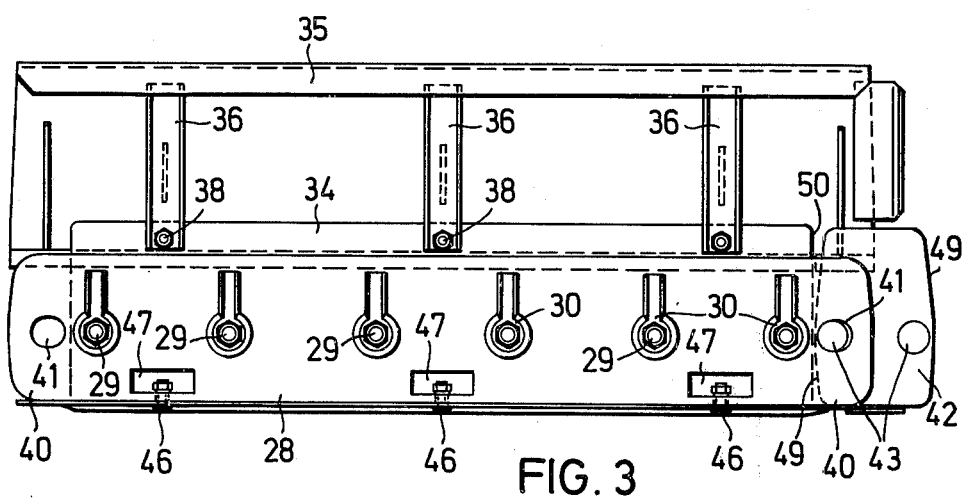
FIG. 3 is a side view of one of the channel sections of the loading conveyor also on a somewhat enlarged scale.
Figure 4:
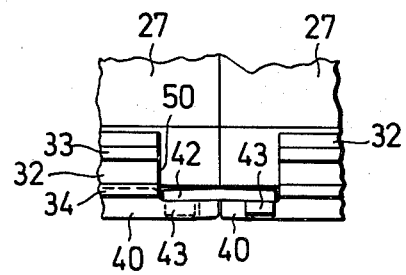
FIG. 4 is a detail side view of part of the coupling means between the stiffening members of the loading conveyor.

The displacement of the conveyor 12 with the aid of the apparatus 18 imparts considerable forces to the conveyor 12 and hence it is desirable to construct the conveyor 12 in the manner now described. The conveyor 12 is in known manner constructed from a series of channel sections 24 arranged end-to-end. The connection between the adjacent ends of the individual channel sections 24 would be such as to permit a certain degree of movement or flexibility between the channel sections. Such connections are known per se. In known manner a scraper chain assembly is circulated along the channel sections 24 to effect the transference of material and this assembly is entrained around a rotatable reversing drum at the forward end of the conveyor 12, i.e., adjacent the end face 13, and around a driving drum driven by drive means 25 at the rear end of the conveyor 12, i.e., adjacent the conveyor 16. The scraper-chain assembly is depicted schematically in FIG. 2 by the dotted outline referenced S. In known manner the assembly may employ central chains, shown as circles, or outer chains, shown as crosses. Referring now to FIGS. 2 to 4 each channel section 24 of the conveyor 12 is composed of two side walls 26 of sigma-shaped cross-section adjoined, as by welding, to a floor 27 which forms a conveying surface for the scraper-chain assembly. For convenience, the scraper-chain assembly is not shown in the drawings. Reinforcement means in the form of rigid, stout stiffening members or plates 28 are affixed to the walls 26 with the aid of threaded members or bolts 29. Each member or plate 28 has a length approximately equal to that of the associated channel section 24 and a height likewise approximately the same as the side walls 26. The plates 28 have recesses 30 in their external sides for accommodating the nuts engaged on the bolts 29 and bores 31 communicate with the recesses 30 to accept the shank of the bolts 29. The heads of the bolts 29 are held captive in V-shaped grooves at the external sides of the walls 26. Each stiffening plate 28 has a somewhat L-shaped cross-sectional profile with a horizontal portion or limb 32 engaging over the upper flange 26' of the assoociated side wall 26. At the upper side of the limb 32 of each plate 28 there are two upstanding webs 33, 34 with a generally U-shaped groove therebetween. An L-shaped shoulder 39 is provided on the upper side of the limb 32 adjacent the laterally-external web 34. This arrangement at the upper side of the limb 32 of each plate 28 is designed to form part of a connection means for an inclined screen or barrier attachment plate 35 and an associated support 36. More paticularly, as shown at the right hand side of FIG. 2 the supports 36 can be affixed with screws 37 to the horizontal face of the shoulders 39 and the plates 35 can be affixed with screws to the web 33. Alternatively, as shown at the left hand side of FIG. 2 laterally-extending screws 38 can pass through both webs 33, 34 and secure both the supports 36 and the plates 35. The plates 35 serve to increase the capacity of the conveyor 42 in known manner.

The plates 28 are interconnected at the floor level with a cover plate 44 which shields off the lower run of the scraper chain assembly, i.e., the zone 45. The plate 44 is connected to the plates 28 with the aid of threaded members or bolts 46 and recesses 47 are provided in the plates 28 to accommodate the nuts engaged on the bolts 46 and facilitate assembly.

The numeral 48 in FIG. 2 represents the guide member 19 of the shifting apparatus 18 and as can be appreciated the entire conveyor channel section 24 rests on the guide member 48. The chains 23 and the pawl devices are not shown in FIG. 2 but the chains 23 can be affixed to the outsides of the plates 28. Referring now particularly to FIG. 4, the limbs 32 and of course the webs 33, 34 thereof are cut away to terminate a short distance from the end of the plates 28 so that over the end regions of each plate 28 there is just a main wall portion denoted 40. These wall portions 40 have centrally-located bores 41 therein. The adjacent wall portions 40 of the plates 28 of adjoining channel sections 24 are interconnected with the aid of coupling means in the form of plates 42 provided with pins 43 which engage in the bores 41. The plates 42 partly overlap and lie alongside the wall portions 40 associated therewith. As can be seen from FIG. 3, the diameter of the bores 41 is eccentric or non-uniform so that the bores 41 have a somewhat larger dimension in the horizontal direction thereby permitting a certain degree of horizontal movement of the pins 43 and hence the coupling plates 42 as well as a pivotal movement in a vertical plane. The ends 49 of the coupling plates 42 are made curvilinear as shown and can engage against complementary abutment surfaces 50 formed at least partly by the limbs 32 of the plates 28. This form of coupling between the channel sections 24 is advantageous and enables a certain degree of vertical mobility between the channel sections 24 thereby enabling the conveyor 12 to cope with uneven floors. However, the provision of the stiffening plates 28 provides superior reinforcement, especially at the connections between the channel sections 24, thereby preventing the channel sections from becoming deformed or damaged when the conveyor 12 is displaced by the apparatus 18.

We claim:

1. In a mineral mining installation having a scraper-chain conveyor composed of a series of channel sections arranged end-to-end and a scraper-chain assembly for movement along the channel sections to effect transference of material, each channel section being composed of two side walls, each of generally sigma-shaped cross-section with inwardly directed upper and lower flanges and a floor connected between the side walls and a shifting apparatus for displacing the conveyor longitudinally; the improvements comprising stiffening members attached to the side walls of each channel section, each stiffening member being an integral component having an L-shaped cross-section with a main portion covering the exterior of the associated side wall and a further portion covering the upper flange of said associated side wall, the upper surface of the further portion being connected to further attachment plates extending upwardly therefrom and coupling means serving to pivotably interconnect adjacent stiffening members of adjoining channel sections.

2. For use in a mineral mining installation the combination of a scraper-chain conveyor and a shifting apparatus for displacing the conveyor longitudinally; the conveyor comprising a series of channel sections arranged end-to-end, each channel section being composed of two side walls each with a generally sigma-shaped cross-section and a floor connected between the walls, a scraper-chain assembly for movement along the channel sections to effect transference of material and reinforcement means for the channel sections, said reinforcement means being in the form of stiffening members attached to the exteriors of the side walls of each channel section to substantially cover said exteriors and coupling means interconnecting the stiffening members, the upper sides of the stiffening members being shaped to receive and connect with further plates which can extend upwardly beyond the side walls of the channel sections whereby to increase the capacity of the conveyor, and covers for screening off the underside of each channel section of the conveyor, each cover being connected to the stiffening members of the associated channel section.

3. For use in a mineral mining installation the combination of a scraper-chain conveyor and a shifting apparatus for displacing the conveyor longitudinally; the conveyor comprising a series of channel sections arranged end-to-end, each channel section being composed of two side walls each with a generally sigma-shaped cross-section and a floor connected between the walls, a scraper-chain assembly for movement along the channel sections to effect transference of material and reinforcement means for the channel sections, said reinforcement means being in the form of stiffening members attached to the exteriors of the side walls of each channel section, each stiffening member having an L-shaped profile in cross-section with a main portion substantially covering the exterior of the associated channel section side wall and a further portion extending over said side wall, the upper side of said further portion of each stiffening member being provided with at least two upstanding webs serving to receive and connect with further plates which extend upwardly beyond the side walls of the channel sections and are inclined away from the longitudinal center of the conveyor in a vertical direction when installed whereby to increase the capacity of the conveyor, coupling means interconnecting the stiffening members and supports for the further plates, said supports being located outwardly of the further plates relative to the longitudinal center of the conveyor and spaced apart longitudinally of the conveyor, the supports being engaged on and connected to the further portions of the stiffening members.

4. The combination of claim 3, wherein each coupling means permits a certain degree of free movement between the stiffening members connected thereby.

5. The combination of claim 4, wherein each coupling means is in the form of a coupling plate which overlaps end portions of the stiffening members connected thereby, the coupling plate carrying pins which locate within eccentric bores in the associated stiffening members.

6. The combination of claim 5, wherein the ends of the coupling plate are curvilinear and engage on end abutment surfaces of the stiffening members.

7. The combination of claim 3, wherein each coupling means is in the form of a coupling plate which overlaps end portions of the stiffening members connected thereby, the coupling plate carrying pins which locate within eccentric bores in the associated stiffening members, the ends of the coupling plate being curvilinear and engaging on end abutment surfaces formed by terminating the further portions of the associated stiffening members inwardly of the ends of the main portions thereof.

* * * * *